United States Patent
Dornbusch et al.

(10) Patent No.: US 9,175,129 B2
(45) Date of Patent: Nov. 3, 2015

(54) TWO-LAYER COATING SYSTEM HAVING IMPROVED INTERCOAT ADHESION

(75) Inventors: Michael Dornbusch, Düsseldorf (DE);
Ulf Schlotterbeck, Mannheim (DE);
Frank Strickmann, Steinfurt (DE);
Fatmir Raka, Münster (DE)

(73) Assignee: BASF COATINGS GMBH, Munster (DE)

( * ) Notice: Subject to any disclaimer, the term of this patent is extended or adjusted under 35 U.S.C. 154(b) by 1112 days.

(21) Appl. No.: 13/057,675

(22) PCT Filed: Aug. 5, 2009

(86) PCT No.: PCT/EP2009/005646
§ 371 (c)(1),
(2), (4) Date: Mar. 8, 2011

(87) PCT Pub. No.: WO2010/015386
PCT Pub. Date: Feb. 11, 2010

(65) Prior Publication Data
US 2011/0262649 A1    Oct. 27, 2011

(30) Foreign Application Priority Data
Aug. 6, 2008   (DE) .................. 10 2008 036 685

(51) Int. Cl.
| | | |
|---|---|---|
| B05D 1/36 | (2006.01) |
| B05D 5/00 | (2006.01) |
| B05D 3/02 | (2006.01) |
| B01F 3/04 | (2006.01) |
| B32B 27/00 | (2006.01) |
| B32B 27/40 | (2006.01) |
| C08F 2/46 | (2006.01) |
| C08F 8/30 | (2006.01) |
| C08F 283/04 | (2006.01) |
| C08G 18/08 | (2006.01) |
| C08G 18/28 | (2006.01) |
| C08G 18/67 | (2006.01) |
| C08J 7/18 | (2006.01) |
| C08K 3/20 | (2006.01) |
| C08L 75/00 | (2006.01) |
| C08G 18/70 | (2006.01) |
| C08G 18/83 | (2006.01) |
| B05D 3/06 | (2006.01) |
| B05D 7/00 | (2006.01) |
| C08G 18/80 | (2006.01) |
| C09D 175/16 | (2006.01) |

(52) U.S. Cl.
CPC ............. *C08G 18/706* (2013.01); *B05D 1/36* (2013.01); *B05D 3/02* (2013.01); *B05D 3/06* (2013.01); *B05D 5/00* (2013.01); *B05D 5/005* (2013.01); *B05D 7/53* (2013.01); *B05D 7/532* (2013.01); *B05D 7/542* (2013.01); *B32B 27/00* (2013.01); *B32B 27/40* (2013.01); *C08F 2/46* (2013.01); *C08F 283/04* (2013.01); *C08G 18/67* (2013.01); *C08G 18/80* (2013.01); *C08G 18/807* (2013.01); *C08G 18/83* (2013.01); *C09D 175/16* (2013.01)

(58) Field of Classification Search
USPC .......... 524/589, 590, 591, 839, 840; 525/123, 525/455, 329.9; 522/90, 173, 174; 427/258, 427/372.2, 385.5, 407.1, 487; 428/423.1, 428/424.2
See application file for complete search history.

(56) References Cited

U.S. PATENT DOCUMENTS

| | | | |
|---|---|---|---|
| 4,288,527 A | | 9/1981 | Morgan |
| 4,939,213 A | | 7/1990 | Jacobs, III et al. |
| 5,030,514 A | | 7/1991 | Hartman |
| 5,084,541 A | | 1/1992 | Jacobs, III et al. |
| 5,981,653 A | * | 11/1999 | Wilmes et al. ............ 524/839 |
| 6,677,045 B1 | * | 1/2004 | Meisenburg et al. ...... 428/424.2 |
| 2003/0139512 A1 | * | 7/2003 | Wegner et al. ............ 524/445 |
| 2004/0048976 A1 | * | 3/2004 | Bremser et al. ........... 524/589 |
| 2008/0132646 A1 | * | 6/2008 | Trindade et al. .......... 525/124 |

FOREIGN PATENT DOCUMENTS

| | | |
|---|---|---|
| CN | 1252424 A | 5/2000 |
| CN | 101203330 A | 6/2008 |
| DE | 2003579 B2 | 1/1974 |
| DE | 3316593 A1 | 11/1984 |
| DE | 3636183 A1 | 3/1988 |
| DE | 3836370 A1 | 5/1990 |
| DE | 19908018 A1 | 8/2000 |
| DE | 19914896 A1 | 10/2000 |
| DE | 10010416 A1 | 9/2001 |
| DE | 10101103 A1 | 7/2002 |
| DE | 10113273 A1 | 9/2002 |
| DE | 10335620 A1 | 3/2005 |

(Continued)

OTHER PUBLICATIONS

International Preliminary Report on Patentability for International application No. PCT/EP2009/005646 dated Feb. 8, 2011.

(Continued)

*Primary Examiner* — Patrick Niland
(74) *Attorney, Agent, or Firm* — Cantor Colburn LLP

(57) ABSTRACT

A two-coat coating system for producing a two-coat coating, comprising (A) a composition of a transparent radiation-curable or radiation-curable and thermally curable clearcoat material, comprising at least one hydroxy-functional binder, and (B) a pigmented coating composition, the pigmented coating composition comprising at least one blocked, water-soluble or water-dispersible isocyanate.

5 Claims, No Drawings

(56) References Cited

FOREIGN PATENT DOCUMENTS

| | | |
|---|---|---|
| DE | 102005049520 A1 | 5/2006 |
| DE | 102005049521 A1 | 5/2006 |
| DE | 102005020605 A1 | 11/2006 |
| DE | 102005053663 A1 | 5/2007 |
| EP | 0002866 B1 | 7/1981 |
| EP | 0054105 A1 | 6/1982 |
| EP | 0288964 A2 | 11/1988 |
| EP | 0624577 A1 | 11/1994 |
| EP | 709415 * | 5/1996 |
| EP | 0754740 B1 | 11/2001 |
| JP | 2004512949 A | 4/2004 |
| JP | 2004532308 A | 10/2004 |
| WO | WO0216461 A1 | 2/2002 |
| WO | WO02079333 A1 | 10/2002 |
| WO | WO03016095 A1 | 2/2003 |
| WO | WO2006058680 A1 | 6/2006 |
| WO | WO2006067003 A1 | 6/2006 |
| WO | WO2006117091 A1 | 11/2006 |

OTHER PUBLICATIONS

International Search Report for International application No. PCT/EP2009/005646 dated Nov. 5, 2009.

Written Opinion for International application No. PCT/EP2009/005646 dated Nov. 5, 2009.

* cited by examiner

TWO-LAYER COATING SYSTEM HAVING IMPROVED INTERCOAT ADHESION

CROSS REFERENCE TO RELATED APPLICATIONS

This application is a National Phase Application of Patent Application PCT/EP2009/005646 filed on 5 Aug. 2009, which claims priority to DE 10 2008 036 685.4, filed 6 Aug. 2008, both of which are hereby incorporated by reference in their entirety.

FIELD OF THE INVENTION

The present invention relates to two-coat coating systems for producing two-coat coatings comprising a transparent radiation-curable and optionally thermally curable coating material and a pigmented coating material, the systems comprising at least one hydroxy-functional binder in the coating composition of the transparent coating material.

BACKGROUND OF THE INVENTION

Multicoat coatings find diverse applications primarily in the coating of vehicles and the coating of films. In the case of automotive finishing, the system generally used is a multicoat coating system comprising an electrocoat, a surfacer, and a topcoat consisting of a basecoat and a clearcoat. Multicoat color and/or effect films which can be used, for example, to produce moldings generally comprise a support film, at least one basecoat and a clearcoat, which in terms of their composition typically correspond to the corresponding coating materials in automotive finishing.

Topcoat systems are typically applied by the wet-on-wet technique, in which the two coating materials are applied close to one another after flashing off (interim drying) of the basecoat material, but without interim crosslinking of the basecoat material, before then being cured together. Since, after the basecoat material has been flashed off (subjected to interim drying), it is not to be caused to bleed by the applied clearcoat material, both coating materials are generally based on solvents having strongly differing polarities. In this case, typically, aqueous basecoat materials and nonaqueous clearcoat materials are employed.

Presently, in order to reduce the emission of solvents, use is made of purely radiation-curable clearcoat materials and dual-cure clearcoat materials (clearcoat materials curable thermally and with actinic radiation), which are distinguished in particular by a low viscosity in conjunction with low solvent content in the uncured coating materials, and which possess properties that are good per se.

Thus, WO 2006/058680 A1 describes scratchproof coatings which are radiation-curable and may additionally be thermally curable and which are employed as topcoats, more particularly as or in automotive clearcoats and topcoats, and also as coatings on films. As synthesis components they comprise at least one compound having at least one isocyanate group, at least one compound containing at least one silicon atom and at least one isocyanate-reactive group, and at least one compound having at least one isocyanate-reactive group and at least one free-radically polymerizable group. Multicoat coatings in which the scratchproof coating can be used, however, are not described therein.

DE 10 2005 053 663 A1 describes aqueous, structurally viscous powder dispersions which are curable by free-radical polymerization and which have as their disperse phase particles having an average size of 80 to 750 nm, the particles containing at least one free-radically crosslinkable binder having a glass transition temperature of −70 to +50° C., an olefinically unsaturated double bond content of 2 to 10 eq/kg, and an acid group content of 0.05 to 15 eq/kg, in an amount, based on the particles, of 50% to 100% by weight. The powder dispersions can be employed in particular as clearcoat materials. Specific multicoat coatings in which the aqueous, structurally viscous powder dispersions curable by free-radical polymerization can be used, however, are not described.

WO 2006/067003 A1 describes multicomponent systems comprising (A) at least one component which contains isocyanate-reactive functional groups, is free from isocyanate groups, and contains functional groups with bonds which can be activated with actinic radiation, or is free from these functional groups. The systems further comprise (B) at least one component which contains isocyanate groups, is free from isocyanate-reactive functional groups, and optionally contains functional groups with bonds which can be activated with actinic radiation, with the proviso that at least one of the two components, (A) or (B), contains functional groups with bonds which can be activated with actinic radiation. Component (A) or at least one of the components (A) comprises at least one light stabilizer (L) selected from the group consisting of low molecular weight, oligomeric, and polymeric light stabilizers which contain at least one isocyanate-reactive functional group, and also (P) at least one photoinitiator which contains at least one isocyanate-reactive functional group. Dual-curable mixtures produced therefrom are suitable for producing films and moldings and also as coating materials, more particularly for clearcoats of multicoat paint systems. No further description is given of the basecoats which can be employed in such systems.

DE 10 2005 049 520 A1 describes a method of producing moldings from coated films, and also moldings produced therefrom. The films described in the publication are coated both with a pigmented coating material (P) and with a crosslinkable coating material (K) that comprises a free-radically crosslinkable component (KK) and which, after final crosslinking, produces a transparent coating (KE). This free-radically crosslinkable component (KK) comprises (i) one or more oligourethane and/or one or more polyurethane (meth) acrylates and (ii) on average more than one ethylenically unsaturated double bond per molecule, (iii) has a number-average molecular weight of 1000 to 10000 g/mol, (iv) a double bond content of 1.0 to 5.0 mol of double bonds per 1000 g of reactive component (KK), (v) on average >one branching point per molecule, (vi) 5%-50% by weight, based in each case on the weight of component (KK), of cyclic structural elements, and (vii) at least one aliphatic structural element having at least 6 C atoms in the chain, the free-radically crosslinkable component (KK) containing carbamate and/or biuret and/or allophanate and/or urea and/or amide groups. Besides the polyurethane (meth)acrylates, the free-radically crosslinkable component (KK) may also have constituents with other functional groups, such as hydroxyl, carboxyl, amino and/or thiol groups, for example. Use is additionally made, as a pigmented coating material (P), of a solventborne or aqueous coating material which typically comprises (I) one or more solvents and/or water, (II) one or more binders, preferably one or more polyurethane resins and/or one or more acrylate resins, and (III) if desired, at least one crosslinking agent, (IV) at least one pigment, and (V) if desired, one or more typical auxiliaries and additives.

WO 2006/117091 A1 describes a method of producing films coated first with a transparent coating and then with a pigmented coating, the films themselves, and their use in the production of moldings. This film can be peeled from the coatings. The crosslinkable coating composition (K) comprises a free-radically crosslinkable component (KK) which (i) contains one or more oligourethane and/or one or more polyurethane (meth)acrylates and which has (ii) a number-average molecular weight of 1000 to 50000 g/mol and (iii) a double bond content of 1.0 to 5.0 mol of double bonds per 1000 g of reactive component (KK), the free-radically crosslinkable component (KK) (iv) containing on average >1 branching point per molecule, (v) containing 5%-50% by weight, based in each case on the weight of component (KK), of cyclic structural elements, and (vi) having at least one aliphatic structural element with at least 6 C atoms in the chain, and (vii) containing carbamate and/or biuret and/or allophanate and/or urea and/or amide groups. These polyurethane (meth)acrylates may also contain other functional groups, such as hydroxyl, carboxyl, amino and/or thiol groups, for example. Suitable binders of the pigmented coating are the polyurethane resins and acrylate resins that are used typically in basecoat materials in the sector of the automobile industry. Additionally it is possible for the pigmented coating materials further to comprise at least one amino resin as crosslinking agent.

However, diverse requirements are imposed on the appearance of multilayer coatings, and are inadequately met by the systems known to date. In many cases, for instance, the adhesion of the clearcoat to the basecoat does not persistently meet the requirements imposed.

SUMMARY OF THE INVENTION

It is an object of the present invention, therefore, to provide a two-coat coating system which can be used to produce multicoat coatings, which is composed of a transparent radiation-curable and optionally thermally curable coating material and of a pigmented coating material, with improved adhesion between the two coats, without detrimental effect on the optical properties (appearance) of the two-coat system or on its curability, more particularly its radiation-curability. A further intention, particularly in the area of coated films, is to produce high flexibility in the resultant coatings.

The aforementioned objects are achieved by means of a two-coat coating system which has at least one hydroxy-functional binder in the coating composition of the transparent coating material, and at least one blocked, water-soluble or water-dispersible isocyanate in the pigmented coating composition.

DETAILED DESCRIPTION OF AN EMBODIMENT OF THE INVENTION

"Blocked isocyanates" in the sense of the present invention are meant isocyanates whose isocyanate groups have been reversibly reacted (blocked) with other compounds (blocking agents). Typical blocking agents are, for example, caprolactam, butanone oxime or diethyl malonate, and also aromatic or cycloaliphatic amines, especially triazole derivatives and pyrazole derivatives, and also secondary amines. These blocking agents are eliminated only after application, in the course of curing, and so the liberated isocyanate group is then available for reaction. With particular preference the "blocked isocyanates" in the sense of the present invention are isocyanates blocked with triazole or pyrazole derivative.

In addition it is necessary for the blocked isocyanate used to be water-soluble or water-dispersible. A blocked isocyanate is considered water-soluble when it has a solubility in water of more than 10 g/l at 25° C. A blocked isocyanate is considered water-dispersible when it can be dispersed in an aqueous phase such that within the aqueous phase it forms a finely divided disperse phase having a maximum average particle size of 5 µm. The particle size can be determined using suitable methods known to the skilled worker, such as by microscopy or using the laser scattering method, for example.

The blocked isocyanate used in the sense of the invention may be an aliphatic, aromatic, araliphatic or cycloaliphatic isocyanate. Particular preference is given to using aliphatic isocyanates, in order to ensure sufficient UV stability on the part of the coating.

The blocked isocyanates used may be monomeric, oligomeric or polymeric in nature. Particularly good intercoat adhesion results when the at least one isocyanate used is polymeric in nature. With very particular preference the isocyanate used has an averaged functionally of 2-5 blocked isocyanate groups and an averaged molar mass of 500-20000 g/mol (weight average).

The molar mass determination is made by gel permeation chromatography against a polystyrene standard.

Blocked isocyanates which can be used with particular advantage are polymeric isocyanates which contain polyethylene or oligoethylene oxide groups, to improve the water solubility, and which are based on polymers or oligomers of HDI (hexamethylene diisocyanate) or IPDI (isophorone diisocyanate).

The fraction of the blocked isocyanates in the pigmented coating composition is preferably between 15% and 35% by weight, more preferably between 20% and 30% by weight, based on the solids content of the pigmented coating composition.

Particular preference is given to using noncrystalline blocked isocyanates which can be deblocked at temperatures of ≤150° C., preferably ≤130° C. Aside from the fact that their use allows very low-energy curing, they can be employed to particularly good effect in pigmented basecoat compositions that can be used for producing coated films. By noncrystalline isocyanates are meant those isocyanates which are present wholly, or very much predominantly, in the amorphous or liquid state. Noncrystalline blocked isocyanates of this kind are principally oligomers of HDI or IPDI or mixtures of the two. The oligomers may be allophanates, uretdiones, isocyanurates or other isocyanate adducts.

The two-coat coating system in the sense of the present invention is preferably a system comprising an aqueous pigmented coating composition and a nonaqueous transparent coating composition. On curing, coating compositions of this kind form, as a two-coat system in automotive OEM finishing, for example, topcoats which are highly resistant to environmental effects. Aqueous coating compositions here are those whose solvent fraction is composed predominantly of water; in other words, any fraction of nonaqueous cosolvents there may be is only at a level such that the aqueous character is retained, and their water content is more than 5% by weight, preferably more than 20% by weight, and with particular preference more than 40% by weight. Nonaqueous coating compositions are those here whose water content is not more than 5% by weight, preferably not more than 3% by weight, and more preferably not more than 1% by weight. The term "nonaqueous coating compositions" embraces, equally, nonaqueous solventborne paints and powder coating materials.

In the pigmented coating compositions it is preferred to use solventborne or aqueous pigmented coating materials (P) which in general are curable physically or thermally and/or with actinic radiation. They comprise preferably (I) one or more solvents and/or water, (II) one or more binders, preferably one or more polyurethane resins and/or acrylate resins, (III) if desired, at least one crosslinking agent, (IV) one or more pigments, and (V) if desired, one or more typical auxiliaries and additives, and are described in DE 10 2005 049 520 A1, for example. Optimum results are achieved with these coating materials.

Advantageous examples of (P) are the typical and known, physically and/or thermally curable, conventional or aqueous basecoat materials, of the kind known, for example, from WO 03/016095 A1, page 10 line 15 to page 14 line 22, or in particular from U.S. Pat. No. 5,030,514, column 2 line 63 to column 6 line 68 and column 8 line 53 to column 9 line 10, and also from EP-B-754 740, column 3 line 37 to column 6 line 18.

Very particular preference is given to using thermally curable aqueous basecoat materials (P).

Suitable binders in this context are principally the polyurethane resins and acrylate resins that are typically used in the sector of the automobile industry, control being exerted in particular over the flexibility and hence the suitability of the binders for the method of the invention, in a manner known to the skilled worker, via the selection of the nature and amount of the synthesis components used for preparing these binders. For details, reference may again be made, for example, to U.S. Pat. No. 5,030,514, column 2 line 63 to column 6 line 68 and column 8 line 53 to column 9 line 10.

The pigmented coating materials further preferably comprise as crosslinking agent at least one amino resin. Suitability is possessed in principle by the amino resins that are typically used in the sector of the paint industry, the properties of the pigmented coating materials being controllable via the reactivity of the amino resins.

The amount of binder and, if appropriate, amino resin in the pigmented coating material may be varied widely and is typically 0% to 70% by weight, preferably 10% to 60% by weight, of polyurethane resin, 0% to 70% by weight, preferably 10% to 60% by weight, of acrylate resin, and 0% to 45% by weight, preferably 5% to 40% by weight, of amino resin, in each case based on the total amount of binder plus amino resin.

Relative to the total weight of the pigmented coating material (P), the fraction of binder plus, where appropriate, amino resin is typically 10% to 70%, preferably 30%-60% by weight.

The pigmented coating composition further comprises at least one pigment. The pigment is preferably selected from the group consisting of organic and inorganic, color-imparting, effect-imparting, color- and effect-imparting, magnetically shielding, electrically conductive, corrosion-inhibiting, fluorescent, and phosphorescent pigments. Preference is given to using the color and/or effect pigments.

Examples of suitable effect pigments, which may also impart color, are metal flake pigments, such as commercially available aluminum bronzes, aluminum bronzes chromated in accordance with DE 36 36 183 A1, and commercially available stainless steel bronzes, and also nonmetallic effect pigments, such as, for example, pearlescent pigments and interference pigments, platelet-shaped effect pigments based on iron oxide, or liquid-crystalline effect pigments. For further details refer to the pigments in Römpp Lexikon Lacke and Druckfarben, Georg Thieme Verlag, 1998, page 176, "Effect pigments" and pages 380 and 381, "Metal oxide-mica pigments" to "Metal pigments".

Suitable organic and/or inorganic color pigments are the pigments typically employed in the paint industry.

The pigment content of the pigmented coating composition may vary very widely and is guided primarily by the depth of the color and/or the intensity of the effect it is intended to produce, and also by the dispersibility of the pigments in the pigmented coating composition. The pigment content, based in each case on the total weight of the pigmented coating composition, is preferably 0.5% to 50%, more preferably 1% to 30%, very preferably 2% to 20%, and more particularly 2.5% to 10% by weight.

In addition to the above-described pigments, the pigmented coating composition may comprise typical and known auxiliaries and additives, such as organic and inorganic, transparent and hiding fillers and nanoparticles, and also further typical auxiliaries and additives, in typical amounts, preferably 0% to 40% by weight, based on the coating material (P).

The pigmented coating composition is applied typically in an amount such as to result in a dry film thickness of at least 15 μm, preferably of 20 to 100 μm, more preferably of 20 to 50 μm.

The two-coat coating system of the invention further comprises a composition of a transparent radiation-curable or radiation-curable and thermally curable clearcoat material, comprising at least one hydroxy-functional binder. A clearcoat material according to EN ISO 4618:2006 is a coating material which, when applied to a substrate, forms a transparent coating having protective, decorative or specific technical properties. The transparent clearcoat material generally comprises no pigments or fillers, at most dyes or very fine, transparent pigments. The transparent character of the clearcoat material is retained in this case. The transparent clearcoat material of the two-coat coating system of the invention has a hiding power lower than that of the pigmented coating composition of the two-coat coating system of the invention.

The hydroxy-functional binder in the composition of the transparent coating material is preferably a typical oligo- or polyhydroxy-functional binder which in addition contains at least one free-radically reactive group. Free-radically reactive groups in this context are groups having double and triple carbon-carbon bonds, preferably vinyl groups and (meth) acrylic groups. The existence of these groups allows reaction of the hydroxy-functional binder with the radiation-curable component of the transparent coating composition. Preferred compounds for the hydroxy-functional binder, with respect to the (meth)acrylate groups, are mono-, oligo- or polyfunctional (meth)acrylate polyols, hydroxy-functional urethane acrylates, and (meth)acrylated polyether and polyester polyols. Particularly good results are achieved with pentaerythritol triacrylate and dipentaerythritol hydroxypentaacrylate. With hydroxy-functional urethane acrylates, too, particularly good results are achieved.

The hydroxy-functional binder preferably possesses a hydroxyl number (OHN) of 50 to 150. The hydroxyl number is determined by boiling a sample of the hydroxy-functional binder with acetic anhydride-pyridine and titrating the resultant acid with potassium hydroxide solution. The hydroxyl number indicates the number of milligrams of potassium hydroxide that are equivalent to the amount of acetic acid bound in acetylation by 1 g of the hydroxy-functional binder.

Additionally the hydroxy-functional binder preferably possesses a functionality of 4.0 to 11.0 mol per 1000 g in respect of the free-radically reactive group.

The weight-average molecular weight of the hydroxy-functional binder is preferably 300-2000 g/mol. The molar mass determination is made by gel permeation chromatography against a polystyrene standard.

The fraction of the hydroxy-functional binder in the transparent coating composition is preferably 1.5% to 10% by weight, based on the solids fraction of the transparent coating composition. Optimum results are achieved within these ranges.

The transparent coating composition is with further preference a nonaqueous coating composition and preferably comprises a free-radically crosslinkable component (KK) which comprises one or more oligourethane (meth)acrylates and/or one or more polyurethane (meth)acrylates.

Here and below, an oligomer is a compound which in general contains on average 2 to 10 basic structures or monomer units. A polymer, in contrast, is a compound which in general contains on average more than 10 basic structures or monomer units. Mixtures or physical entities of this kind are also referred to by those skilled in the art as binders or resins. Conversely, here and below, a low molecular weight compound is a compound which derives essentially only from one basic structure or one monomer unit.

The free-radically crosslinkable component (KK) contains preferably at least 50% by weight, more preferably at least 70% by weight, based in each case on the solids content of the component (KK), of one or more oligourethane (meth)acrylates and/or of one or more polyurethane (meth)acrylates.

The free-radically crosslinkable component (KK) contains preferably less than 5% by weight, more preferably less than 1% by weight, based in each case on the weight of the component (KK), of free isocyanate groups, and more particularly contains substantially no detectable free isocyanate groups.

Particularly good two-coat coatings result when the free-radically crosslinkable component (KK) (i) comprises one or more oligourethane and/or one or more polyurethane (meth) acrylates and (ii) contains on average more than one ethylenically unsaturated double bond per molecule, (iii) has a number-average molecular weight of 1000 to 10000 g/mol, (iv) has a double bond content of 1.0 to 5.0 mol of double bonds per 1000 g of reactive component (KK), (v) has on average >1 branching point per molecule, (vi) contains 5%-50% by weight, based in each case on the weight of component (KK), of cyclic structural elements, and (vii) contains at least one aliphatic structural element having at least 6 C atoms in the chain, and additionally (viii) contains carbamate and/or biuret and/or allophanate and/or urea and/or amide groups.

The free-radically crosslinkable component (KK) contained in the crosslinkable coating material (K) may also comprise a mixture of different oligo- and/or polyurethane (meth)acrylates, which may also have different double bond contents, molecular weights, double bond equivalent weights, amounts of branching points and amounts of cyclic and also relatively long-chain aliphatic structural elements, and different amounts of carbamate, biuret, allophanate, amide and/or urea groups.

This mixture can be obtained by mixing different oligourethane and/or polyurethane (meth)acrylates, or by producing different products at the same time in the preparation of a corresponding oligourethane or polyurethane (meth)acrylate.

Besides the urethane (meth)acrylates, further suitable free-radically crosslinkable constituents of component (KK) include monomers, but preferably oligomers and/or polymers, more particularly polyester (meth)acrylates, epoxy (meth)acrylates, (meth)acryloyl-functional (meth)acrylic copolymers, polyether (meth)acrylates, unsaturated polyesters, amino (meth)acrylates, melamine (meth)acrylates and/ or silicone (meth)acrylates, preferably polyester (meth)acrylates and/or epoxy (meth)acrylates and/or polyether (meth) acrylates. Preference here is given to polymers which in addition to the double bonds also contain hydroxyl, carboxyl, amino and/or thiol groups.

To obtain effective crosslinking it is preferred to use free-radically crosslinkable components (KK) having a high functional-group reactivity, more preferably free-radically crosslinkable components (KK) which include acrylic double bonds as functional groups.

The urethane (meth)acrylates can be prepared in a manner known to the skilled worker from a compound containing isocyanate groups and from at least one compound containing groups that are reactive toward isocyanate groups, by mixing the components in any order, if appropriate at an elevated temperature. It is preferred here to add the compound that contains groups reactive toward isocyanate groups to the compound that contains isocyanate groups, preferably in two or more steps.

More particularly the urethane (meth)acrylates are obtained by introducing the di- or polyisocyanate and adding to it at least one hydroxyalkyl (meth)acrylate or hydroxyalkyl ester of other ethylenically unsaturated carboxylic acids, so first reacting some of the isocyanate groups. Subsequently a chain extender from the group of diols/polyols and/or diamines/polyamines and/or dithiols/polythiols and/or alkanolamines is added and in this way the remaining isocyanate groups are reacted with the chain extender.

A further possibility is to prepare the urethane (meth)acrylates by reaction of a di- or polyisocyanate with a chain extender and subsequent reaction of the remaining free isocyanate groups with at least one ethylenically unsaturated hydroxyalkyl ester.

It will be appreciated that all intermediate forms of these two methods are also possible. For example, a fraction of the isocyanate groups of a diisocyanate can first be reacted with a diol, and then a further fraction of the isocyanate groups can be reacted with the ethylenically unsaturated hydroxyalkyl ester, after which the remaining isocyanate groups can be reacted with a diamine.

Generally speaking, the reaction is carried out at temperatures between 5 and 100° C., preferably between 20 to 90° C. and more preferably between 40 and 80° C., and in particular between 60 and 80° C.

In this context it is preferred to operate under anhydrous conditions. Anhydrous here means that the water content of the reaction system is not more than 5% by weight, preferably not more than 3% by weight, and more preferably not more than 1% by weight.

In order to suppress polymerization of the polymerizable double bonds it is preferred to operate under an oxygen-containing gas, more preferably air or air/nitrogen mixtures. Oxygen-containing gases which can be used include preferably air or a mixture of oxygen or air and a gas which is inert under the prevailing conditions. Inert gases which can be used include nitrogen, helium, argon, carbon monoxide, carbon dioxide, steam, lower hydrocarbons, or mixtures thereof. The oxygen content of the oxygen-containing gas may be for example between 0.1% and 22% by volume, preferably from 0.5% to 20%, more preferably 1% to 15%, very preferably 2% to 10%, and more particularly 4% to 10% by volume. It will be appreciated that, if desired, higher oxygen contents may also be used.

The reaction can also be carried out in the presence of an inert solvent, such as acetone, isobutyl methyl ketone, methyl ethyl ketone, toluene, xylene, butyl acetate or ethoxyethyl acetate, for example.

Through selection of the nature and amount of di- and/or polyisocyanate, chain extender, and hydroxyalkyl ester employed, control is exerted over the further variables of the urethane (meth)acrylates, such as, for example, double bond content, double bond equivalent weight, amount of branching points, amount of cyclic structural elements, amount of aliphatic structural elements having at least 6 C atoms, of biuret, allophanate, carbamate, urea and/or amide groups, and the like.

Through the selection of the particular amounts of di- or polyisocyanate and chain extender used and also through the functionality of the chain extender it is also possible, furthermore, to prepare urethane (meth)acrylates which in addition to the ethylenically unsaturated double bonds also contain other functional groups, examples being hydroxyl, carboxyl, amino and/or thiol groups of the like. The urethane (meth) acrylates preferably also contain hydroxyl and/or carboxyl groups.

Particularly when the urethane (meth)acrylates are to be used in aqueous coating materials (K), a fraction of the free isocyanate groups present in the reaction mixtures are also reacted with compounds which contain an isocyanate-reactive group, preferably selected from the group consisting of hydroxyl, thiol, and primary and secondary amino groups, more particularly hydroxyl groups, and also at least one, especially one, acid group, preferably selected from the group consisting of carboxyl groups, sulfonic acid groups, phosphoric acid groups, and phosphonic acid groups, more particularly carboxyl groups. Examples of suitable compounds of this kind are hydroxyacetic acid, hydroxypropionic acid or gamma-hydroxybutyric acid, more particularly hydroxyacetic acid.

The polyester (meth)acrylates that are suitable as well as the urethane (meth)acrylates are known in principle to the skilled worker. They can be prepared by a variety of methods. For example, acrylic and/or methacrylic acid can be used directly as an acid component in the synthesis of the polyesters. A further possibility is to use hydroxyalkyl esters of (meth)acrylic acid as an alcohol component directly during the synthesis of the polyesters. Preferably, however, the polyester (meth)acrylates are prepared by acrylicization of polyesters. First of all, for example, hydroxyl-containing polyesters can be synthesized, and are then reacted with acrylic or methacrylic acid. It is also possible first to synthesize carboxyl-containing polyesters, which are then reacted with a hydroxyalkyl ester of acrylic or methacrylic acid. Unreacted (meth)acrylic acid can be removed from the reaction mixture by washing, by distillation or, preferably, by reaction with an equivalent amount of a monoepoxide or diepoxide compound, using suitable catalysts, such as triphenylphosphine, for example. For further details on the preparation of the polyester acrylates, reference may be made in particular to DE-A 33 16 593 and DE-A 38 36 370 and also to EP-A-54 105, DE-B 20 03 579, and EP-B-2866.

The additionally suitable polyether (meth)acrylates are also known likewise in principle to the skilled worker. They can be prepared by a variety of methods. For example, hydroxyl-containing polyethers which are esterified with acrylic acid and/or methacrylic acid can be obtained by reaction of dihydric and/or polyhydric alcohols with different amounts of ethylene oxide and/or propylene oxide by well-known methods (cf., e.g., Houben-Weyl, Volume XIV, 2, Makromolekulare Stoffe II, (1963)). Use may also be made of polymerization products of tetrahydrofuran or of butylene oxide.

Through selection of the nature and amount of alcohol and acid components used, control is exerted over the further variables of the polyether (meth)acrylates and polyester (meth)acrylates, such as, for example, double bond content, double bond equivalent weight, amount of branching points, amount of cyclic structural elements, amount of aliphatic structural elements having at least 6 C atoms, and the like.

Furthermore, epoxy (meth)acrylates are also well known to the skilled worker and therefore need no further elucidation here. They are typically prepared by addition of acrylic acid to epoxy resins, as for example to epoxy resins based on bisphenol A, or other commercially available epoxy resins.

It is essential to the invention, furthermore, that the free-radically crosslinkable component (KK) contain on average more than 1, preferably at least 2, ethylenically unsaturated double bond(s) per molecule. With particular preference the free-radically crosslinkable component (KK) contains more than 2 up to a maximum of 10.0, more particularly 3.0 to 9.5, preferably 3.5 to 9.0, and very preferably 4.0 to 8.5 double bonds per molecule.

In general the free-radically crosslinkable component (KK) contains not more than 10% by weight of compounds which contain only one ethylenically unsaturated double bond per molecule group, preferably not more than 7.5% by weight, more preferably not more than 5% by weight, very preferably not more than 2.5% by weight, more particularly not more than 1% by weight, and especially 0% by weight.

As the double bond content per molecule of the free-radically crosslinkable component (KK) goes up there is generally an increase in the crosslinking density of the finally crosslinked transparent coating (KE). At the same time, however, as the double bond content per molecule of the free-radically crosslinkable component (KK) goes up, there is a decrease in the breaking extension of the finally crosslinked transparent coating (KE); in other words, the system becomes more brittle. Therefore, as the double bond content per molecule goes up, the finally crosslinked transparent coating (KE) has an increased tendency toward stress cracks after UV curing.

The introduction of the double bonds into the component (KK) takes place, as described above, in general by reaction of one or more ethylenically unsaturated hydroxyalkyl esters with the isocyanate groups of the isocyanate and/or of the isocyanate prepolymer in the case of the urethane (meth) acrylates, or with the acid groups of the polyester in the case of the polyester (meth)acrylates. Similarly, as described above, the starting oligomers or starting polymers, such as polyesters, polyethers, epoxides, and acrylate polymers, for example, may be reacted with acrylic and/or methacrylic acid and/or with another ethylenically unsaturated acid.

Examples of suitable ethylenically unsaturated hydroxyalkyl esters are hydroxyalkyl esters of acrylic and methacrylic acid, of maleic and fumaric acid, of crotonic and isocrotonic acid, and of vinylacetic acid, preferably ethylenically unsaturated hydroxyalkyl esters of acrylic acid. With particular preference the ethylenically unsaturated hydroxyethyl and/or hydroxypropyl and/or hydroxybutyl and/or hydroxypentyl and/or hydroxyhexyl esters, with very particular preference ethylenically unsaturated hydroxyethyl esters or ethylenically unsaturated hydroxyethyl esters together with ethylenically unsaturated hydroxybutyl esters, of the stated unsaturated acids, more particularly of acrylic acid, are used.

It will be appreciated that for the introduction of the double bonds into the component (KK) it is also possible to use hydroxyalkyl esters having more than one double bond per molecule, such as, for example, pentaerythritol diacrylate, pentaerythritol triacrylate, and pentaerythritol tetraacrylate or the like. With very particular preference the double bonds are introduced into component (KK) using 2-hydroxyethyl acrylate and/or 4-hydroxybutyl acrylate and/or pentaerythritol triacrylate.

Under certain circumstances, depending on its structure, the compound used to introduce the double bonds itself influences the properties of the coating, since under certain circumstances not only the double bond content but also other parameters, such as the urethane group content, for example, are altered. Where, for example, the double bond content of component (KK) is increased by replacing some of the chain extender with hydroxyethyl acrylate, the urethane group content is altered in accordance with the mass ratio of chain extender to hydroxyethyl acrylate. Where, in contrast, the double bond content of component (KK) is increased, for example, by using, instead of hydroxyethyl acrylate, hydroxyalkyl esters having more than one double bond per molecule, such as pentaerythritol triacrylate and/or pentaerythritol tetraacrylate, for example, the urethane group content is moderately reduced.

The free-radically crosslinkable component (KK) further possesses preferably a number-average molecular weight of 1000 to 10000 g/mol, preferably of 2000 to 5000 g/mol, and more preferably of 2500 to 3500 g/mol.

The higher the molecular weight of the reactive component (KK), the lower, in general, the crosslinking density of the finally crosslinked transparent coating (KE). At the same time, in general, the higher the molecular weight of the reactive component (KK), the higher, generally, the resistance of the transparent coating (KT) before it has been finally crosslinked.

The free-radically crosslinkable component (KK) preferably has a double bond content of 1.0 to 5.0 mol of double bonds per 1000 g of reactive component (KK), preferably a double bond content of 1.5 to 4.0 mol of double bonds per 1000 g of reactive component (KK), and more preferably a double bond content of more than 2.0 to 3.5 mol of double bonds per 1000 g of reactive component (KK), the values being based in each case on the weight of the free-radically crosslinkable component (KK), but, of course, without unreactive components, such as solvents, water or additives, for example.

As the skilled worker is aware, the double bond content of component (KK) is correlated not only with the double bond content per molecule but also with the number-average molecular weight of component (KK).

As the double bond content of component (KK) goes down, there is an improvement in the quality whereby the dried but not yet finally crosslinked transparent coating (KT) no longer flows and is no longer marked by any protective film applied. At the same time, in general, as the double bond content of component (KK) goes down, there is a reduction in the crosslinking density of the finally crosslinked transparent coating (KE). As the skilled worker is aware, the molecular weight and the double bond content can be adjusted via the nature and amount of the synthesis components employed and also via the reaction conditions.

The free-radically crosslinkable component (KK) preferably contains on average per molecule >1, more preferably >1.4, with particular preference >2 branching points.

A reduction in the average number of branching points per molecule in component (KK) is generally accompanied by a decrease in the scratch resistance of the finally crosslinked transparent coating (KE). At the same time, as the average number of branching points per molecule becomes lower, in general, there is a reduction in the resistance of the dried but not yet finally crosslinked transparent coating (KT).

The average number of branching points per molecule in component (KK) is generally adjusted through the amount of compounds having a functionality of greater than 2, more particularly having a functionality of at least 3, that are used for the synthesis of component (KK).

The branching points of the free-radically crosslinkable component (KK) are introduced preferably via the use of isocyanates having a functionality greater than 2, more particularly having a functionality of at least 3. With particular preference the branching points are introduced by using trimeric and/or polymeric isocyanates, more particularly isocyanurates, and/or adducts and/or prepolymers having an isocyanate functionality of more than 2, more particularly allophanates and/or biurets, to prepare the oligourethane and/or polyurethane (meth)acrylates used in the free-radically crosslinkable component (KK). With very particular preference the branching points are introduced via the use of one or more isocyanurates and/or one or more biurets. It is also possible, however, when synthesizing the free-radically crosslinkable component (KK), to use alcohols, thiols or amines having a functionality of more than 2, through the use, for example, of pentaerythritol, dipentaerythritol, trimethylolethane, trimethylolpropane, ditrimethylolpropane, and trishydroxyethyl isocyanurate.

Additionally the free-radically crosslinkable component (KK) advantageously contains 5%-50%, preferably 10%-40%, more preferably 15%-30%, by weight, of cyclic structural elements, based in each case on the weight of component (KK) (but of course without unreactive components, such as solvents, water or additives, for example).

As the amount of cyclic structural elements in component (KK) goes up, there is generally an improvement in the quality whereby the dried but not yet finally crosslinked transparent coating (KT) no longer flows and is no longer marred by any protective film applied.

As the amount of cyclic structural elements in component (KK) goes up, there are also generally increases in the chemical resistance, the weathering stability, and the scratch resistance of the finally crosslinked transparent coating (KE). Furthermore, with an excessive amount of cyclic structural elements of component (KK), there is a reduction in the breaking extension of the finally crosslinked coating (KE) and hence an increase in brittleness.

It is preferred for the free-radically crosslinkable component (KK) to contain as cyclic structural elements monocyclic structural elements having 4 to 8, more preferably having 5 to 6, ring members, and/or polycyclic structural elements having 7 to 18 ring members, more preferably dicyclic and/or tricyclic structural elements having preferably 10 to 12, very preferably tricyclodecane rings, and/or for the cyclic structural elements to be substituted.

The cyclic structural units may be cycloaliphatic, heterocyclic, and aromatic, the structural units being preferably cycloaliphatic and/or heterocyclic. Use is made more particularly of a combination of cycloaliphatic and heterocyclic structural units.

The heterocyclic structural units may be in the chain—as is the case where uretdiones are used, for example—and/or may form the branching points—as in the case where isocyanurates are used, for example. The cycloaliphatic structural units may likewise be in the chain—as in the case, for example, where cycloaliphatic diols are used, such as hydrogenated bisphenol A, to synthesize the urethanes, for example—and/or may form the branching points. With particular preference, however, the heterocyclic structural units form the branching points, while the cycloaliphatic structural units are in the chain.

Preferred cycloaliphatic structural elements are unsubstituted or substituted cyclopentane rings, unsubstituted or substituted cyclohexane rings, unsubstituted or substituted dicycloheptane rings, unsubstituted or substituted dicylooctane rings and/or unsubstituted or substituted dicyclodecane rings and/or unsubstituted or substituted tricyclodecane rings, more particularly unsubstituted or substituted tricyclodecane rings and/or unsubstituted or substituted cyclohexane rings.

The heterocyclic structural units may be saturated, unsaturated or aromatic. It is preferred to use saturated heterocyclic structural units. The heteroatoms are preferably selected from the group nitrogen and/or oxygen and/or sulfur and/or phosphorus and/or silicon and/or boron, more preferably nitrogen. The number of heteroatoms per ring is typically 1 to 18, preferably 2 to 8, and very preferably 3. Heterocyclic structural units used with particular preference are isocyanurate rings and/or uretdiones and/or unsubstituted or substituted triazine rings, especially isocyanurate rings.

Also suitable in principle for introducing the cyclic structural elements are aromatic structural elements, in which case the amount of aromatic structural elements is preferably not more than 10%, more preferably not more than 5% and very preferably not more than 2% by weight, based in each case on the weight of component (KK). This is because aromatic structural elements generally have adverse effects on the weathering stability of the resultant finally crosslinked transparent coating (KE), and so the amount of the aromatic structural elements is frequently limited for that reason.

The cyclic structural elements may be introduced into the reactive component (KK) through the use of corresponding compounds having cyclic structural elements for preparing component (KK). Component (KK) can be prepared using, in particular, di- and/or polyisocyanates having cyclic structural elements and/or di- and/or polyols, di- and/or polyamines, and/or di- and/or polythiols having cyclic structural elements. Particular preference is given to using diols and/or polyols and/or diisocyanates and/or polyisocyanates having cyclic structural elements.

For preparing the oligo- and/or poly-urethane (meth)acrylates used in the free-radically crosslinkable component (KK) it is therefore preferred to make at least proportional use, as isocyanate component, of isocyanurates of di- and/or polyisocyanates, which are commonly employed in the coatings industry. Instead of or together with these isocyanurates it is possible to use prepolymers and/or adducts, especially biurets and/or allophanates and/or uretdiones, of di- and/or polyisocyanates, which are commonly used in the coatings industry. Particular preference is given to using isocyanurates and/or biurets and/or allophanates and/or uretdiones of aliphatic and/or cycloaliphatic isocyanates. In addition it is also possible to use cycloaliphatic di- and/or polyisocyanates alone or in combination with the above-recited isocyanurates and/or biurets and/or allophanates and/or uretdiones.

Examples of (cyclo)aliphatic di- and/or polyisocyanates which are commonly used in the coatings industry include hexamethylene diisocyanate, octamethylene diisocyanate, decamethylene diisocyanate, dodecamethylene diisocyanate, tetradecamethylene diisocyanate, trimethylhexane diisocyanate, tetramethylhexane diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanato-cyclohexane, 2,4- or 2,6-diisocyanato-1-methylcyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl) cyclohexane, or mixtures of these polyisocyanates.

Also suitable, furthermore, are isocyanates containing aromatic structural elements in which, however, at least some of the isocyanate groups are attached to aliphatic and/or cycloaliphatic radicals, especially 1,3-bis(2-isocyanatoprop-2-yl)benzene (TMXDI).

For preparing the oligo- and/or poly-urethane (meth)acrylates used in the free-radically crosslinkable component (KK) it is particularly preferred to make at least proportional use of the isocyanurate of (cyclo)aliphatic isocyanates, especially the isocyanurate of isophorone diisocyanate and/or hexamethylene diisocyanate. Very particular preference is given to using a mixture of the isocyanurate of isophorone diisocyanate and/or the isocyanurate of hexamethylene diisocyanate and/or the biuret of hexamethylene diisocyanurate and/or 1,3-bis(iso-cyanatomethyl)cyclohexane and/or dicyclohexylmethane 4,4'-diisocyanate.

Further of suitability are the higher polyfunctional polyisocyanates described in EP-B-1 144 476 on page 4 line 43 to page 5 line 31 and based on isocyanurates (a2.1 therein), uretdiones (a2.2 therein), biurets (a2.3 therein), polyisocyanates containing urethane and/or allophanate groups (a2.4 therein), polyisocyanates containing oxadiazinetrione groups (a2.6 therein), and carbodiimide- or uretonimine-modified polyisocyanates (a.2.7 therein).

For preparing the oligomers and/or polymers used in the free-radically crosslinkable component (KK), especially the oligo- and/or poly-urethane (meth)acrylates, preference is also given to making at least proportional use of cycloaliphatic diols and/or polyols and/or cycloaliphatic diamines and/or polyamines, especially cycloaliphatic diols, such as cyclohexanedimethanol, 1,2-, 1,3- or 1,4-cyclohexanediol, cyclooctanediol, hydrogenated bisphenol A, hydrogenated bisphenol F and tricyclodecanedimethanol, for example.

Particular preference, for preparing the oligomers and/or polymers used in the free-radically crosslinkable component (KK), especially the oligo- and/or poly-urethane (meth)acrylates, is given to using hydrogenated bisphenol A.

As already mentioned, cyclic structural elements can also be introduced by the use of aromatic structural elements—for example, via the proportional use of aromatic isocyanates or trimers and/or prepolymers and/or adducts of aromatic isocyanates, such as of 1,2- 1,3- and 1,4-benzene diisocyanate, 2,4- and 2,6-tolylene diisocyanate, 4,4'-biphenylene diisocyanate, bis(4-isocyanatophenyl)methane, 2,2-bis(4-isocyanatophenyl)propane and the positionally isomeric naphthalene diisocyanates, especially the technical mixtures of 2,4- and 2,6-tolylene diisocyanate, for example. Further examples of suitable aromatic structural units are triazine rings.

These structural units may be introduced, for example, via the use of tris(alkoxycarbonylamino)triazines in accordance with U.S. Pat. No. 4,939,213, U.S. Pat. No. 5,084,541 and EP-A-624 577. Derivatives of the aforementioned compounds can also be employed.

Preferably, the free-radically crosslinkable component (KK) comprises at least one aliphatic structural element having at least 6 C atoms, preferably having 6 to 18 C atoms, more preferably having 6 C atoms, in the chain.

These structural elements have a flexibilizing effect on component (KK). As the amount of aliphatic structural elements having at least 6 C atoms in the chain in component (KK) goes up, therefore, there is a deterioration in the capacity of the transparent coating (KT) which has been dried but is not yet finally crosslinked to no longer flow and to no longer be marked by any protective film that may be applied.

Moreover, the lower the amount of aliphatic structural elements having at least 6 C atoms in the chain, the better the chemical resistance of the finally crosslinked transparent coating.

The free-radically crosslinkable component (KK) contains preferably 3%-30%, more preferably 5%-25% and very preferably 8%-20% by weight, based in each case on the weight of component (KK) (but of course excluding unreactive components, such as solvents, water or additives, for example), of aliphatic structural elements having at least 6 C atoms in the chain. Suitability for introduction into component (KK) is possessed by all relatively long hydrocarbon chains.

The introduction of this aliphatic structural element having at least 6 C atoms in the chain into the reactive component (KK) takes place through the use of corresponding compounds containing this aliphatic structural element having at least 6 C atoms in the chain for preparing component (KK). For preparing the urethane (meth)acrylates use may be made in particular of di- and/or polyisocyanates and/or chain extenders (diols and/or polyols, diamines and/or polyamines, dithiols and/or polythiols, dicarboxylic and/or polycarboxylic acids, etc.) containing this aliphatic structural element having at least 6 C atoms in the chain. Particular preference is given to using diols and/or polyols and/or dicarboxylic and/or polycarboxylic acids and/or diisocyanates and/or polyisocyanates containing this aliphatic structural element having at least 6 C atoms in the chain.

Suitability is possessed, for example, by dimeric and/or trimeric fatty acids for modifying the di- and/or polyisocyanate.

With particular preference this aliphatic structural element having at least 6 C atoms in the chain is introduced into the free-radically crosslinkable component (KK) through the use of correspondingly functionalized derivatives of hexamethylene, in particular through the use of compounds based on hexamethylene and additionally containing at least 1, preferably at least 2, isocyanate group(s) or OH and/or NH and/or SH group(s), in the preparation of the oligo- and/or polyurethane (meth)acrylates.

Examples of compounds which can be employed include hexamethylene diisocyanate and/or isocyanate-functional trimers and/or polymers and/or isocyanate-functional adducts of hexamethylene diisocyanate, especially the biuret and/or the isocyanurate of hexamethylene diisocyanate. Further possibilities for use include hexamethylenediol and/or hexamethylenediamine or similar compounds. A further possibility, finally, is the use of compounds which besides at least 1 ethylenically unsaturated double bond and at least 1 reactive group which is reactive toward isocyanate groups or OH groups or NH groups also contains said aliphatic structural element having at least 6 C atoms in the chain, such as hydroxyhexyl acrylate, for example.

Correspondingly the polyether (meth)acrylates and the polyester (meth)acrylates can also be flexibilized, for example, by reacting corresponding OH-functional prepolymers and/or oligomers (based on polyether or polyester) with relatively long-chain aliphatic dicarboxylic acids, especially aliphatic dicarboxylic acids having at least 6 C atoms, such as adipic acid, sebacic acid, dodecanedioic acid and/or dimer fatty acids, for example. This flexibilizing reaction can be carried out before or after the addition reaction of acrylic and/or methacrylic acid with the oligomers and/or prepolymers. Flexibilization of the epoxy (meth)acrylates is possible in a similar way, for example, by reacting corresponding epoxy-functional prepolymers and/or oligomers with relatively long-chain aliphatic dicarboxylic acids, especially aliphatic dicarboxylic acids having at least 6 C atoms, such as adipic acid, sebacic acid, dodecanedioic acid and/or dimer fatty acids, for example. This flexibilization reaction can be carried out before or after the addition reaction of acrylic and/or methacrylic acid with the oligomers and/or prepolymers.

As set out above, the flexibilization of the polyether (meth) acrylates and/or of the polyester (meth)acrylates and/or of the epoxy (meth)acrylates, in other words an increase in amount of aliphatic structural elements having at least 6 C atoms in the chain, results in a deterioration in the capacity of the transparent coating (KT) which has been dried but as yet not finally crosslinked to no longer flow and to no longer be marked by any protective film that may be applied.

The free-radically crosslinkable component (KK) further comprises preferably carbamate and/or biuret and/or allophanate and/or urea and/or amide groups. Particularly preferably the component (KK) comprises biuret and/or allophanate groups.

The higher the amount of carbamate and/or biuret and/or allophanate and/or urea and/or amide groups, the lower is the tendency of the clearcoat film (KT) which has been dried but as yet not finally crosslinked to flow.

The higher the amount of carbamate and/or biuret and/or allophanate and/or urea and/or amide groups, the better too are in general the properties of the finally crosslinked transparent coating (KE).

With very particular preference the amount of carbamate and/or biuret and/or allophanate and/or urea and/or amide groups is adjusted via the nature and amount of the isocyanate adducts and/or isocyanate prepolymers used.

Preferably the free-radically crosslinkable component (KK) has an average carbamate and/or biuret and/or allophanate and/or urea and/or amide group content of more than 0 to 2.0 mol per 1000 g of reactive component (KK), preferably of from 0.1 to 1.1 mol and particularly preferably of from 0.2 to 0.7 mol per 1000 g of reactive component (KK), the values being based in each case on the weight of the free-radically crosslinkable component (KK), but of course excluding unreactive components such as solvents, water or additives, for example.

The transparent coating composition contains preferably 30.0% to 99.9%, more preferably 40% to 85% and very preferably 50% to 75% by weight, based in each case on the overall weight of the coating material (K), of component (KK).

The transparent coating composition preferably comprises at least one initiator of chemical crosslinking. These initiators are preferably photoinitiators. The photoinitiator or photoinitiators is or are preferably selected from the group consisting of unimolecular (type I) and bimolecular (type II) photoinitiators. More preferably the photoinitiators of type I are selected from the group consisting of benzophenones in combination with tertiary amines, alkylbenzophenones, 4,4'-bis-(dimethylamino)benzophenone (Michler's ketone), anthrone and halogenated benzophenones and the photoinitiators of type II are selected from the group consisting of benzoins, benzoin derivatives, especially benzoin ethers, benzil ketals, acylphosphine oxides, especially in the case of 2,4,6-trimethylbenzoyldiphenylphosphine oxide and ethyl 2,4,6-trimethylbenzoylphenyl phosphinate, bisacylphosphine oxides, phenylglyoxylic esters, camphorquinone, alpha-aminoalkylphenones, alpha,alpha-dialkoxyacetophenones and alpha-hydroxyalkylphenones.

If the crosslinking of the coating materials is completed exclusively or additionally by thermal means then they preferably include C—C-cleaving initiators, preferably benzpinacols. Examples of suitable benzpinacols are benzpinacol silyl ethers or the substituted and unsubstituted benzpinacols as described in American patent U.S. Pat. No. 4,288,527 A in column 3 lines 5 to 44 and WO02/16461, page 8 line 1 to page 9 line 15. Preference is given to using benzpinacol silyl ethers, particularly mixtures of monomeric and oligomeric benzpinacol silyl ethers.

The amount of the initiators in the transparent coating compositions can vary widely and is guided by the requirements of the case in hand and by the performance properties which it is intended the coatings (KE) produced therefrom should have. The amount is preferably from 0.1% to 10%, in particular from 1.0% to 7.0% by weight, based in each case on the solids of the transparent coating composition.

Furthermore it is possible for the transparent coating compositions to comprise conventional and known additives in effective amounts. Normally the amount of these additives is between 0% and 10% by weight, preferably between 0.2% and 5.0% by weight, based in each case on the solids of the coating material (K). They are preferably selected from the group consisting of light stabilizers, such as UV absorbers and reversible free-radical scavengers (HALS); antioxidants; wetting agents; emulsifiers; slip additives; polymerization inhibitors; adhesion promoters; leveling agents; film-forming auxiliaries; rheological assistants; flame retardants; corrosion inhibitors which are not pigments; free-flow aids; waxes; siccatives; biocides; and matting agents.

Examples of suitable additives are described in detail in the textbook "Lackadditive" [Additives for coatings] by Johan Bieleman, Wiley-VCH, Weinheim, New York, 1998, in D. Stoye and W. Freitag (Editors), in German patent application DE 199 14 896 A1, column 14 line 26 to column 15 line 46, or in German patent application DE 199 08 018 A1, page 9 line 31 to page 8 line 30.

The crosslinkable coating compositions (K) generally further comprise conventional solvents and/or water, but may also be formulated substantially or entirely free from solvent and substantially or entirely free from water, as what are called 100% systems. If the coating compositions (K) include solvents, they contain preferably from 20% to 70%, more preferably from 30% to 64.5% and very preferably from 40% to 60% by weight, based in each case on the overall weight of the coating composition (K), of one or more solvents and/or water, preferably of one or more organic solvents.

Suitable solvents are all those commonly used in clearcoat materials, especially alcohols, glycol ethers, esters, ether esters and ketones, aliphatic and/or aromatic hydrocarbons, such as acetone, methyl isobutyl ketone, methyl ethyl ketone, butyl acetate, 3-butoxy-2-propanol, ethyl ethoxypropionate, butylglycol, dipropylene glycol methyl ether, butyl glycolate, Shellsol® T, pine oil 90/95, Solventnaphtha®, Shellsol® A, petroleum spirit 135/180 and the like, for example.

The crosslinkable coating composition is preferably free or substantially free of water.

The crosslinkable coating composition (K) preferably contains less than 20%, in particular less than 10%, more preferably less than 5% by weight, based in each case on the weight of component (KK), and with very particular preference none at all, of polymeric saturated constituent (KS), especially no thermoplastic polymers.

In terms of its method the preparation of the coating compositions (K) has no particular features but instead takes place by the mixing and homogenizing of the above-described constituents using conventional and known mixing techniques and apparatus such as stirred tanks, agitator mills, kneaders, Ultraturrax, inline dissolvers, static mixers, toothed-wheel dispersers, pressure relief nozzles and/or microfluidizers, preferably in the absence of actinic radiation.

The transparent coating composition is normally applied in an amount such as to result in a dry film thickness of at least 15 µm, preferably a dry film thickness of from 20 to 100 µm, more preferably from 20 to 50 µm.

The transparent coating composition may further comprise at least one light stabilizer (L) selected from the group consisting of low molecular mass, oligomeric, and polymeric light stabilizers containing at least one isocyanate-reactive group, and also at least one photoinitiator (P) which contains at least one isocyanate-reactive functional group.

The light stabilizers (L) are selected from the group consisting of low molecular mass, oligomeric, and polymeric light stabilizers containing at least one, especially one, isocyanate-reactive functional group. Preferably they are selected from the group consisting of UV absorbers and reversible free-radical scavengers. Preferably UV absorbers (L) are selected from the group consisting of benzotriazoles and triazines, and the reversible free-radical scavengers (L) from the group consisting of sterically hindered cyclic amines, more particularly HALS.

The isocyanate-reactive functional groups are preferably hydroxyl groups. In this context, hydroxyl groups which are located in the immediate vicinity of a benzotriazole system and hence interact with a nitrogen of the triazole ring, and also strongly sterically hindered phenol groups which are located, for example, between two tertiary butyl groups, are not isocyanate-reactive functional groups in the sense of the present invention.

Examples of suitable low molecular mass light stabilizers (L) are
- a mixture of 2-(4-((2-hydroxy-3-undecyloxypropyl)oxyl)-2-hydroxyphenyl)-4,6-bis(2,4-dimethylphenyl)-1,3,5-triazine and 2-(4-((2-hydroxy-3-tridecyloxy-propyl)oxyl)-2-hydroxyphenyl)-4,6-bis(2,4-dimethylphenyl)-1,3,5-triazine, sold under the brand name Tinuvin® 400 by Ciba Spezialitätenchemie,
- the experimental product from Ciba Spezialitätenchemie, Tinuvin® CGL 052, which contains a triazine group and two cyclic, sterically hindered aminoether groups, and
- the light stabilizer monomer (a3) described in German patent application DE 100 10 416 A1, page 4.

Examples of suitable oligomeric and polymeric light stabilizers (L) are also the (meth)acrylate copolymers of the light stabilizer monomer (a3) that are described in German patent application DE 100 10 416 A1, page 3 line 31 to page 5 line 32 and page 14 line 42 to page 17 line 20.

The amount of light stabilizers (L) to be used may vary very widely and is guided by the requirements of the case in hand. Preferably the light stabilizers (L) are used in the effective amounts that are customary and known for light stabilizers, preferably in an amount of 0.1% to 5%, preferably 0.2% to 4.5%, more preferably 0.3% to 4%, very preferably 0.4% to 3.5%, and more particularly 0.5% to 3% by weight, based in each case on the solids fraction of the transparent coating composition.

The transparent coating composition may further comprise at least one photoinitiator (P) and in particular at least two photoinitiators (P) containing at least one, more particularly one, isocyanate-reactive functional group.

The photoinitiators (P) are preferably selected from the group consisting of benzil monoketals, acetophenone derivatives, benzyl formates, monoacylphosphine oxides and diacylphosphine oxides. More particularly the photoinitiators (P) are acetophenone derivatives.

The isocyanate-reactive functional groups are preferably hydroxyl groups. In this context, hydroxyl groups which interact with an adjacent carbonyl group via the keto-enol tautomerism and/or are strongly sterically hindered are not isocyanate-reactive functional groups in the sense of the invention.

One example of a suitable photoinitiator (P) is 1-[4-(2-hydroxyethoxy)phenyl]-2-hydroxy-2-methyl-1-propan-1-one, which is sold under the brand name Irgacure® 2959 by Ciba Spezialitätenchemie.

The amount of photoinitiators (P) may vary very widely and is guided by the requirements of the case in hand. Preferably the photoinitiators (P) are used in the effective amounts that are customary and known for photoinitiators, preferably in an amount of 0.1% to 5%, preferably 0.2% to 4.5%, more preferably 0.3% to 4%, very preferably 0.4% to 3.5%, and more particularly 0.5% to 3% by weight, based in each case on the solids fraction of the transparent coating composition.

The two-coat coating systems of the invention can be used to produce coated materials, more particularly films, moldings, coatings, adhesives, and seals.

In particular the two-coat coating compositions of the invention may serve to produce multicoat paint systems, more particularly topcoat systems, in automotive OEM finishing and automotive refinish.

The substrates coated in these contexts are usually typical substrates, which may have been precoated with a cathodic dip coat and already precoated with a surfacer.

Hence it is possible in particular to obtain an improved topcoat intercoat adhesion by adding a hydroxy-functional binder as described above to the clearcoat material, and a corresponding blocked isocyanate as described above to the basecoat material.

The two-coat coating compositions of the invention, however, can also be used with preference to produce multiply coated films. The coated films can then serve themselves for the coating of a wide variety of substrates, or else for the production of moldings. The films coated with the two-coat coating of the invention may more particularly be thermoplastic support films or protective films.

Thermoplastic support films are films which can be joined with the polymeric molding compound of a molding. Located between the surface (T1) and the subsequent coating (B) it is also possible for there to be at least one, especially one, interlayer (ZS), such as surfacer layer (FS) and/or adhesion promoter layer (HS), for example. Between the surface (T1) and the adhesion promoter layer (HS) and/or between the adhesion promoter layer (HS) and the coating (B) in this case there may be at least one, especially one, transition layer (ÜS). Preferably, however, the coating (B) is disposed directly, i.e., without interlayer, on the surface (T1).

Thermoplastic support films are composed essentially or entirely of at least one thermoplastic polymer. The thermoplastic polymer is preferably selected from the group consisting of conventional and known homopolymers and copolymers of linear, branched, star-shaped, comb and/or block construction. The homopolymers and copolymers are preferably selected from the group consisting of polyurethanes, polyesters, especially polyethylene terephthalates and polybutylene terephthalates, polyethers, polyolefins, polyamides, polycarbonates, polyvinyl chlorides, polyvinylidene fluorides, poly(meth)acrylates, especially polymethyl methacrylates and polybutyl methacrylates, and impact-modified polymethyl methacrylates, polystyrenes, especially impact-modified polystyrenes, more particularly acrylonitrile-butadiene-styrene copolymers (ABS), acrylic-styrene-acrylonitrile copolymers (ASA) and acrylonitrile-ethylene-propylene-diene-styrene copolymers (A-EPDM); polyetherimides, polyetherketones, polyphenylene sulfides, polyphenylene ethers, and blends of these polymers.

By ASA are meant, in general, impact-modified styrene/acrylonitrile polymers, in which graft copolymers of vinylaromatic compounds, especially styrene, and of vinyl cyanides, especially acrylonitrile, on polyalkyl acrylate rubbers are present in a copolymer matrix comprising, in particular, styrene and acrylonitrile.

With particular advantage use is made of ASA, polycarbonates, blends of ASA and polycarbonates, polypropylene polymethyl methacrylates or impact-modified polymethyl methacrylates, especially blends of ASA and polycarbonates, preferably with a polycarbonate fraction >40%, in particular >50%.

Materials used with preference for the thermoplastic support film are also, in particular, the thermoplastic polymers described in DE-A-101 13 273 on page 2 line 61 to page 3 line 26.

The homopolymers and copolymers may comprise the additives conventional and known within the field of thermoplastics. They may further comprise conventional and known fillers, including reinforcing fillers, and fibers. Not least they may also comprise the pigments, including effect pigments, and/or conventional and known dyes, and so allow the shade of the support films to be matched to the shade of the coating obtained from the pigmented coating compositions (P).

The layer thickness of the thermoplastic support film (T) is usually more than 0.5 mm, preferably between 0.7 and 2.0 mm and more preferably between 0.9 and 1.2 mm.

As transition layers (ÜS) it is possible to use conventional and known layers, with a thickness of preferably from 1 to 50 µm, of thermoplastic materials, in particular of the thermoplastic polymers described above.

The adhesion promoter layer is used when adhesion between the support film (T) and the polymeric material (KM) is inadequate: for example, if polyolefins are employed for (T) or (KM). As adhesion promoter layer (HS) it is possible to use layers of customary adhesion promoters with a thickness of from 1 to 100 µm preferably, these layers being conventional and as described, for example, in DE-A-101 13 273 on page 4 lines 27 to 29.

Suitable protective films (S) are all commonly used protective films, which may be in single-layer or multilayer form. Use is made in particular of the protective films described in DE-A-10335620, page 17 line 20 to page 19 line 22. Particularly suitable protective films (S) are those based on homopolymers and copolymers of polyethylene, polypropylene, ethylene copolymers, propylene copolymers, and ethylene-propylene copolymers.

The protective film is preferably selected such that with a layer thickness of 50 µm it has a transmittance >70% for UV radiation and visible light with a wavelength of from 230 to 600 nm.

Additionally it is preferred to use protective films which in the temperature range from room temperature to 100° C. have a storage modulus E' of at least $10^7$ Pa and also have a breaking elongation >300% at 23° C. both longitudinally and transversely to the preferential direction generated during the production of the protective film by means of directed production methods. With particular preference the side of the protective film that faces the coating (B) additionally has a hardness <0.06 GPa at 23° C. and a roughness as determined by atomic force microscopy (AFM) corresponding to an $R_a$ value from 50 µm²<30 nm.

With very particular preference the protective films (S) are from 10 to 100 µm, in particular from 30 to 70 µm, thick.

The protective films (S) for use in accordance with the invention are conventional and known and are sold, for example, by Bischof+Klein, D-49525 Lengerich, under the designations GH-X 527, GH-X 529 and GH-X-535.

The invention further encompasses methods of producing coated substrates in automotive OEM finishing and automotive refinish that have been coated with the multicoat paint systems of the invention, where a substrate, coated beforehand if appropriate with a cathodic dipcoat and a typical surfacer, is coated first with the pigmented coating composition and then with the transparent clearcoat composition. This coating takes place preferably by the wet-on-wet technique: that is, the transparent clearcoat composition is applied to the pigmented coating composition after the pigmented coating composition has been subjected to interim drying (flashing off), but without interim baking of the pigmented coating composition, and subsequently the two coats are jointly cured.

Coating with the pigmented coating composition and with the transparent coating composition takes place under the typical conditions for the application of topcoat films in OEM finishing or refinish. An advantage here is that the two-coat coating can be cured at temperatures below 130° C.

The invention further encompasses a method of producing films coated with the two-coat coating system of the invention, in which a film is coated first with the pigmented coating composition and then with the transparent coating composition.

The present invention additionally encompasses a method of producing films coated with the two-coat coating system of the invention, in which a film is coated first with the transparent coating composition and then with the pigmented coating composition.

In both cases the films are preferably first coated with the coat of the two-coat system that is to be applied first, without baking thereof. Then the second coat of the two-coat system is applied and is baked together with the first coat. Here again, the curing of the coats takes place preferably below 130° C.

The application of the individual coats of the two-coat system to the substrate may take place by means of methods that are suitable and known to the skilled worker, as for example by spreading, rolling, rollercoating, knifecoating, flowcoating, pouring, dipping or spraying.

The curing of the applied coats of the two-coat system may likewise take place by means of methods that are suitable and known to the skilled worker, as for example by actinic radiation, preferably UV radiation, or by thermal curing, preferably at temperatures below 130° C. Radiation curing and thermal curing can also be combined and for that purpose carried out in succession or simultaneously. By actinic radiation is meant electromagnetic radiation, more particularly electron beams, UV rays and visible light.

Coated films coated first with the transparent coating composition and then with the pigmented coating composition can be used with advantage to produce two-coat-coated moldings, from which the film can be detached from the molding again (leaving the two-coat coating on the molding) following production.

EXAMPLES

Basecoat Preparation

To prepare the basecoat material A, the commercial pigmented aqueous basecoat material "Brillantsilber" from BASF Coatings AG was adjusted with demineralized water to a viscosity of 120 mP·s (measured by viscometer (Rheomat RM 180, spindle 2) at 23° C. and a shear rate of 1000 s$^{-1}$).

To prepare the basecoat material B of the invention, the commercial pigmented aqueous basecoat material "Brillantsilber" of BASF Coatings AG was mixed with 7.5% by weight, based on the total basecoat material B, of a water-soluble, dimethylpyrazole-blocked HDI polyisocyanate, and the mixture was adjusted with demineralized water to a viscosity of 120 mPa·s (measured by viscometer (Rheomat RM 180, spindle 2) at 23° C. and a shear rate of 1000 s$^{-1}$).

Clearcoat Preparation

A suitable stirred vessel was charged with the urethane acrylate. To this initial charge there were added, over the course of 30 minutes, the components specified in table 1 (OH-group-containing binder, UV absorber, HALS, photoinitiators, and flow control agent) with continuous stirring at room temperature, and this mixture was adjusted using 1-methoxyprop-2-yl acetate to a solids content of 48%. Subsequently the resulting mixture was stirred at room temperature for 30 minutes.

TABLE 1

|  | I | II | III | IV | V | VI |
|---|---|---|---|---|---|---|
| Double-bond-containing urethane acrylate resin | 145.3 | 143.0 | 142.9 | 140.6 | 140.2 | 149.4 |
| OH-functional acrylated polyester without double bonds (OHN = 186) | 2.63 |  |  |  |  |  |
| Pentaerythritol triacrylate (OHN = 106-135) |  | 4.06 |  |  |  |  |
| Dipentaerythritol hydroxypenta-acrylate (OHN about 110) |  |  | 4.14 |  |  |  |
| IRR 351, ucb Chemicals (OH-functional urethane acrylate, OHN = 75-90) |  |  |  | 5.61 |  |  |
| STON 0254 (OH-functional, double-bond-containing binder, OHN = 65.6) |  |  |  |  | 8.08 |  |
| Tinuvin 292 | 0.9 | 0.9 | 0.9 | 0.8 | 0.8 | 0.9 |
| Tinuvin 400 | 2.1 | 2.0 | 2.0 | 2.0 | 2.0 | 2.1 |
| Lucirin TPO-L | 0.7 | 0.7 | 0.7 | 0.7 | 0.7 | 0.7 |
| Irgacure 184 | 2.6 | 2.6 | 2.6 | 2.5 | 2.5 | 2.7 |
| BYK 325 | 0.4 | 0.4 | 0.4 | 0.4 | 0.4 | 0.4 |
| 1-Methoxyprop-2-yl acetate | 45.5 | 46.4 | 46.4 | 47.3 | 45.2 | 43.8 |
| Σ | 200.0 | 200.0 | 200.0 | 200.0 | 200.0 | 200.0 |

Application

A box-type doctor blade was used to apply a wet coat of 150 μm of basecoat material to a cut-to-size section of Luran S PFM film (150 μm wet, about 25 μm dry, 10 mm/s knife speed), and the applied coat was dried at room temperature for 10 minutes and then dried in an exhaust air oven at 90° C. for 10 minutes.

Applied atop the dried basecoat film, subsequently, was the clearcoat material, using a box-type doctor blade (200 μm wet, about 60 μm dry, 10 mm/s blade speed), which was dried at room temperature for 20 minutes and then in an exhaust air oven at 105° C. for 15 minutes.

The clearcoat was crosslinked by UV light (unit from IST, dose: 2300 mJ/cm$^2$, Ga/Hg lamps with 200 W/cm power, set to 85%/95% lamp power for a belt speed of 5 m/min, 200 ppm O₂) and after 7 days was subjected to a steam jet test in accordance with DC (Daimler Chrysler) specification DBL 5416. The two-coat coatings obtained were also investigated in respect of their cohesion, using the cross-cut method of DIN EN ISO 2409. For results see table 2.

TABLE 2

|  |  | I | II | III | IV | V | VI |
|---|---|---|---|---|---|---|---|
| DaimlerChrysler steam jet | A | 5/5/5 | 5/5/5 | 5/5/5 | 5/5/5 | 5/5/5 | 5/5/5 |
|  | B | 5/5/5 | 2/3/4 | 4/4/2 | 3/4/4 | 4/4/4 | 5/5/5 |
| Cross-cut (2 mm) | B | 3-4 | 2-3 | 3 | 3 | 3-4 | 3 |

Preparation: Combine ingredients with stirring
Key to steam jet test results:
0—satisfactory, no subfilm migration
1—still satisfactory, slight subfilm migration
2-5—ever greater subfilm migration
Key to cross-cut results:
0—The cut edges are completely smooth. None of the squares has undergone delamination.
1—The delaminated area is not substantially greater than 5% of the cross-cut area
2—The delaminated area is significantly greater than 5% but not substantially greater than 15% of the cross-cut area
3—The delaminated area is significantly greater than 15% but not substantially greater than 35% of the cross-cut area
4—The delaminated area is significantly greater than 35% but not substantially greater than 65% of the cross-cut area
5—all results which can no longer be classed as 4

The inventive examples (B.II-B.V) display significantly improved intercoat adhesion with equally good optical properties. The resulting films continue to have a high flexibility.

What is claimed is:

1. A method of producing a film coated with a two-coat coating system, comprising coating a film first with a transparent clearcoat composition and then with a pigmented coating composition, wherein
    (A) the transparent clearcoat composition comprises at least one of a transparent radiation-curable clearcoat material comprising at least one hydroxyl-functional binder or a transparent radiation-curable and thermally curable clearcoat material comprising at least one hydroxyl-functional binder as the transparent clearcoat, and
    (B) the pigmented coating composition comprises at least one blocked, water-soluble or water-dispersible isocyanate, and the fraction of the at least one isocyanate as a proportion of the pigmented coating composition is 15% to 35% by weight, based on the solids fraction of the pigmented coating composition.

2. A two-coat coating system for producing a two-coat coating, comprising
    (A) a composition comprising at least one of a transparent radiation-curable clearcoat material comprising at least one hydroxyl-functional binder or a transparent radiation-curable and thermally curable clearcoat material comprising at least one hydroxyl-functional binder, and
    (B) a pigmented coating composition,
wherein the pigmented coating composition comprises at least one blocked, water-soluble or water-dispersible isocyanate, and the hydroxyl-functional binder in the transparent clearcoat composition is an oligo- or polyhydroxy-functional binder having a hydroxyl number of 50 to 150, with at least one free-radically reactive group having a functionality in respect of the free-radically reactive group of 4.0 to 11.0 mol/kg.

3. A two-coat coating system for producing a two-coat coating, comprising
    (A) a composition comprising at least one of a transparent radiation-curable clearcoat material comprising at least one hydroxyl-functional binder or a transparent radiation-curable and thermally curable clearcoat material comprising at least one hydroxyl-functional binder, and
    (B) a pigmented coating composition,
wherein the pigmented coating composition comprises at least one blocked, water-soluble or water-dispersible isocyanate, and the weight-average molecular weight of the hydroxyl-functional binder is 300 to 2000 g/mol.

4. A two-coat coating system for producing a two-coat coating, comprising
    (A) a composition comprising at least one of a transparent radiation-curable clearcoat material comprising at least one hydroxyl-functional binder or a transparent radiation-curable and thermally curable clearcoat material comprising at least one hydroxyl-functional binder, and
    (B) a pigmented coating composition,
wherein the pigmented coating composition comprises at least one blocked, water-soluble or water-dispersible isocyanate, and the fraction of the hydroxyl-functional binder in the transparent clearcoat composition is 1.5% to 10% by weight, based on the solids fraction of the transparent clearcoat composition.

5. A two-coat coating system for producing a two-coat coating, comprising
    (A) a composition comprising at least one of a transparent radiation-curable clearcoat material comprising at least one hydroxyl-functional binder or a transparent radiation-curable and thermally curable clearcoat material comprising at least one hydroxyl-functional binder, and
    (B) a pigmented coating composition,
wherein the pigmented coating composition comprises at least one blocked, water-soluble or water-dispersible isocyanate, and the transparent clearcoat composition is a non-aqueous coating composition which comprises at least one free-radically crosslinkable component (KK) which comprises one or more oligourethane (meth)acrylates and/or one or more polyurethane (meth)acrylates, wherein the free-radically crosslinkable component (KK) comprises
    (i) one or more oligourethane and/or one or more polyurethane (meth)acrylates and
    (ii) on average more than one ethylenically unsaturated double bond per molecule,
    (iii) a number-average molecular weight of 1000 to 10000 g/mol,
    (iv) a double bond content of 1.0 to 5.0 mol of double bonds per 1000 g of reactive component (KK),
    (v) on average >1 branching point per molecule,
    (vi) 5%-50% by weight, based in each case on the weight of component (KK), of cyclic structural elements, and
    (vii) at least one aliphatic structural element having at least 6 C atoms in the chain, and further comprises
    (viii) one or more functional groups selected from the group consisting of carbamate groups, biuret groups, allophanate groups, urea groups, amide groups, and combinations of two or more of the foregoing, in an average functional group content of more than 0 to 2.0 mol per 1000 g of reactive component (KK).

* * * * *